(12) United States Patent
Fairgrieve et al.

(10) Patent No.: US 10,118,615 B2
(45) Date of Patent: Nov. 6, 2018

(54) SYSTEM AND METHOD FOR CONTROLLING THE SPEED OF A VEHICLE USING VEHICLE CONFIGURATION

(71) Applicant: Jaguar Land Rover Limited, Whitley Coventry Warwickshire (GB)

(72) Inventors: Andrew Fairgrieve, Rugby (GB); Daniel Woolliscroft, Birmingham (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 54 days.

(21) Appl. No.: 14/421,874

(22) PCT Filed: Aug. 14, 2013

(86) PCT No.: PCT/EP2013/067012
§ 371 (c)(1),
(2) Date: Feb. 16, 2015

(87) PCT Pub. No.: WO2014/027035
PCT Pub. Date: Feb. 20, 2014

(65) Prior Publication Data
US 2015/0203115 A1    Jul. 23, 2015

(30) Foreign Application Priority Data

Aug. 16, 2012 (GB) .................................. 1214651.0
Mar. 14, 2013 (GB) .................................. 1304654.5

(51) Int. Cl.
*B60T 8/32* (2006.01)
*G05D 1/00* (2006.01)
(Continued)

(52) U.S. Cl.
CPC ........... *B60W 30/143* (2013.01); *B60T 8/175* (2013.01); *B60W 50/085* (2013.01);
(Continued)

(58) Field of Classification Search
CPC ......... B60W 30/143; B60W 2720/106; B60W 30/16; B60W 10/06; B60K 31/047; B60K 31/0008
(Continued)

(56) References Cited

U.S. PATENT DOCUMENTS

| 2004/0068359 A1 | 4/2004 | Neiss et al. |
| 2005/0004732 A1* | 1/2005 | Berry ................... B60W 10/06 701/48 |

(Continued)

FOREIGN PATENT DOCUMENTS

| EP | 1355209 A1 | 10/2003 |
| GB | 2403027 A | 12/2004 |

(Continued)

OTHER PUBLICATIONS

International Search Report for application No. PCT/EP2013/067012, dated Oct. 21, 2013, 4 pages.

(Continued)

*Primary Examiner* — Maceeh Anwari
(74) *Attorney, Agent, or Firm* — Reising Ethington P.C.

(57) ABSTRACT

A method for use with a speed control system of a vehicle is provided. The method comprises receiving readings from one or more vehicle sensors to determine the nature of the terrain over which the vehicle is traveling. The method further comprises gathering information relating to one or more parameters of the vehicle that correspond to the configuration of the vehicle. The method still further comprises determining, based on the nature of the terrain and the gathered information, whether the vehicle is appropriately configured to travel over the terrain. A system comprising an electronic control unit configured to perform the method is also provided.

15 Claims, 5 Drawing Sheets

(51) Int. Cl.
*G06F 7/00* (2006.01)
*G06F 17/00* (2006.01)
*B60W 30/14* (2006.01)
*B60T 8/175* (2006.01)
*F16H 61/02* (2006.01)
*B60W 50/08* (2012.01)
*B60W 50/14* (2012.01)
*F16H 59/66* (2006.01)

(52) U.S. Cl.
CPC .......... *B60W 50/087* (2013.01); *B60W 50/14* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2510/0604* (2013.01); *B60W 2510/0657* (2013.01); *B60W 2510/182* (2013.01); *B60W 2510/20* (2013.01); *B60W 2510/205* (2013.01); *B60W 2520/10* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2540/04* (2013.01); *B60W 2550/12* (2013.01); *B60W 2550/14* (2013.01); *B60W 2550/141* (2013.01); *B60W 2720/10* (2013.01); *B60W 2720/103* (2013.01); *B60Y 2200/20* (2013.01); *F16H 59/66* (2013.01); *F16H 2061/0234* (2013.01)

(58) Field of Classification Search
USPC .......................................................... 701/93
See application file for complete search history.

(56) References Cited

U.S. PATENT DOCUMENTS

| 2005/0131614 | A1 | 6/2005 | Isogai et al. |
| 2010/0049408 | A1 | 2/2010 | Abadie et al. |
| 2012/0197501 | A1* | 8/2012 | Sujan ............... B60K 23/00 701/51 |
| 2014/0350789 | A1* | 11/2014 | Anker ............... B62D 15/025 701/41 |

FOREIGN PATENT DOCUMENTS

| GB | 2492748 A | 1/2013 |
| WO | 2004103761 A1 | 12/2004 |
| WO | 2011128559 A1 | 10/2011 |

OTHER PUBLICATIONS

UK Combined Search and Examination Report for corresponding application No. 1304654.5, dated Aug. 28, 2013, 6 pages.
Written Opinion for application No. PCT/EP2013/067012, dated Oct. 21, 2013, 5 pages.
European Office Action for EP application No. 13 750 321.5, dated Mar. 6, 2018, 5 pages.

* cited by examiner

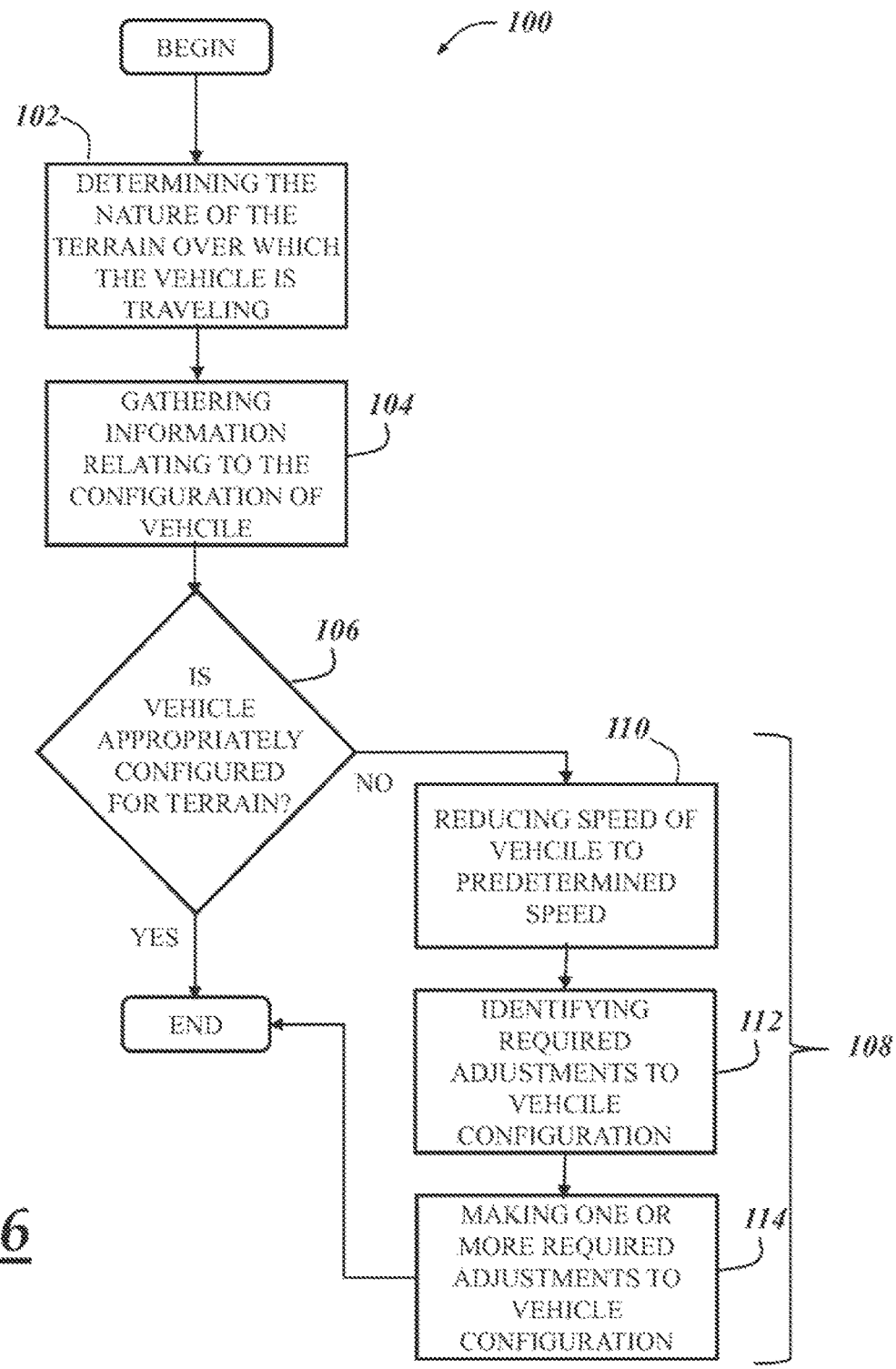

SYSTEM AND METHOD FOR CONTROLLING THE SPEED OF A VEHICLE USING VEHICLE CONFIGURATION

TECHNICAL FIELD

The present disclosure relates generally to vehicle speed control and more particularly, to a system and method that take vehicle configuration into account when controlling the speed of a vehicle.

BACKGROUND

It is known that vehicles may be equipped with speed control systems, such as, for example, on-road cruise control systems, that allow a user to define a desired set-speed and then maintain the speed of the vehicle at that particular set-speed. In very simplistic terms, this is typically accomplished by sending commands to the powertrain subsystem of the vehicle. While such systems have any number of benefits, especially where used exclusively on-road or on-highway, they are not without their drawbacks or disadvantages, in particular where the user desires to operate the vehicle across varied terrain.

For example, one drawback of conventional systems is that they operate independent of, or without regard to, the particular configuration or set-up of the vehicle. More particularly, when in operation, current systems do not assess or evaluate whether the vehicle is appropriately or optimally configured to negotiate the terrain at the desired speed; rather they simply operate to maintain the desired speed regardless of any other considerations. As such, vehicle composure, wear and tear on the vehicle, and/or occupant comfort, among other attributes, may be adversely affected.

Accordingly, there is a need for a system and a method for use with the same that minimizes and/or eliminates one or more of the above-identified deficiencies.

SUMMARY

According to an embodiment, there is provided a method for use with a speed control system of a vehicle. The method comprises: receiving readings from one or more vehicle sensors to determine the nature of the terrain over which the vehicle is traveling; gathering information relating to one or more parameters of the vehicle that correspond to the configuration of the vehicle; and determining, based on the nature of the terrain and the gathered information, whether the vehicle is appropriately configured to travel over the terrain.

According to another embodiment, there is provided a method for use with a speed control system of a vehicle. The method comprises: determining a desired speed for the vehicle; receiving readings from one or more vehicle sensors to determine the nature of the terrain over which the vehicle is traveling; gathering information relating to one of more parameters that correspond to the configuration of the vehicle; and determining, based on the desired speed, the nature of the terrain, and the gathered information, whether the vehicle is appropriately configured to travel over the terrain at the desired speed.

According to a further embodiment, there is a provided a speed control system for a vehicle. The speed control system comprises an electronic control unit configured to: determine the nature of the terrain over which the vehicle is traveling; obtain information relating to one or more parameters that correspond to the configuration of the vehicle; and determine, based on the nature of the terrain and the obtained information, whether the vehicle is appropriately configured to travel over the terrain.

DESCRIPTION OF THE DRAWINGS

One or more embodiments of the invention will now be described, by way of example only, with reference to the following figures in which:

FIGS. 5 and 6 are flow diagrams of embodiments of a method for use with a speed control system.

DETAILED DESCRIPTION

The system and method described herein may be used to control various operating parameters of a vehicle, such as, for example, vehicle speed and the configuration of one of more subsystems, and one or more components, parameters, features (collectively "parameters") thereof, in particular. In one embodiment, the present system and method receive readings from one or more vehicle sensors to determine the nature of the terrain over which the vehicle is traveling, and gather information relating to one or more parameters that correspond to the configuration of the vehicle. Based on the nature of the terrain and the gathered information, the system and method may determine whether the vehicle is appropriately configured to travel over the terrain.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present disclosure.

Figure 1:
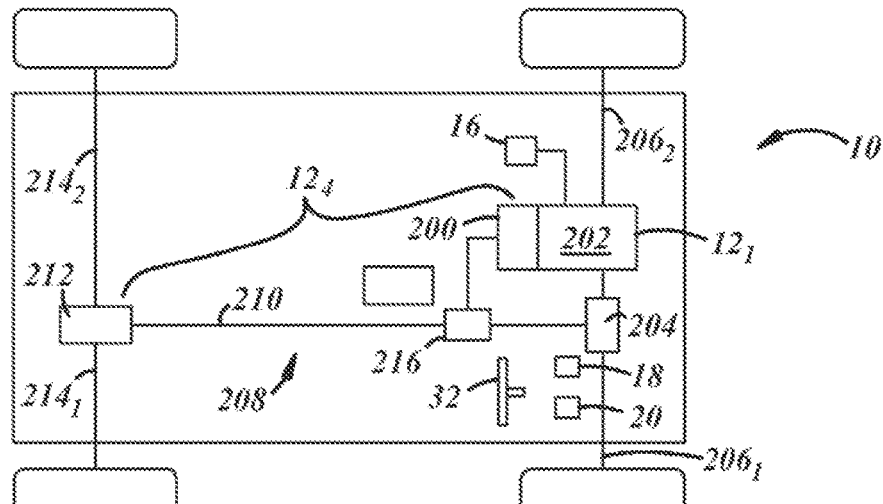
FIG. 1 is a schematic and block diagram of a vehicle.
Figure 2:
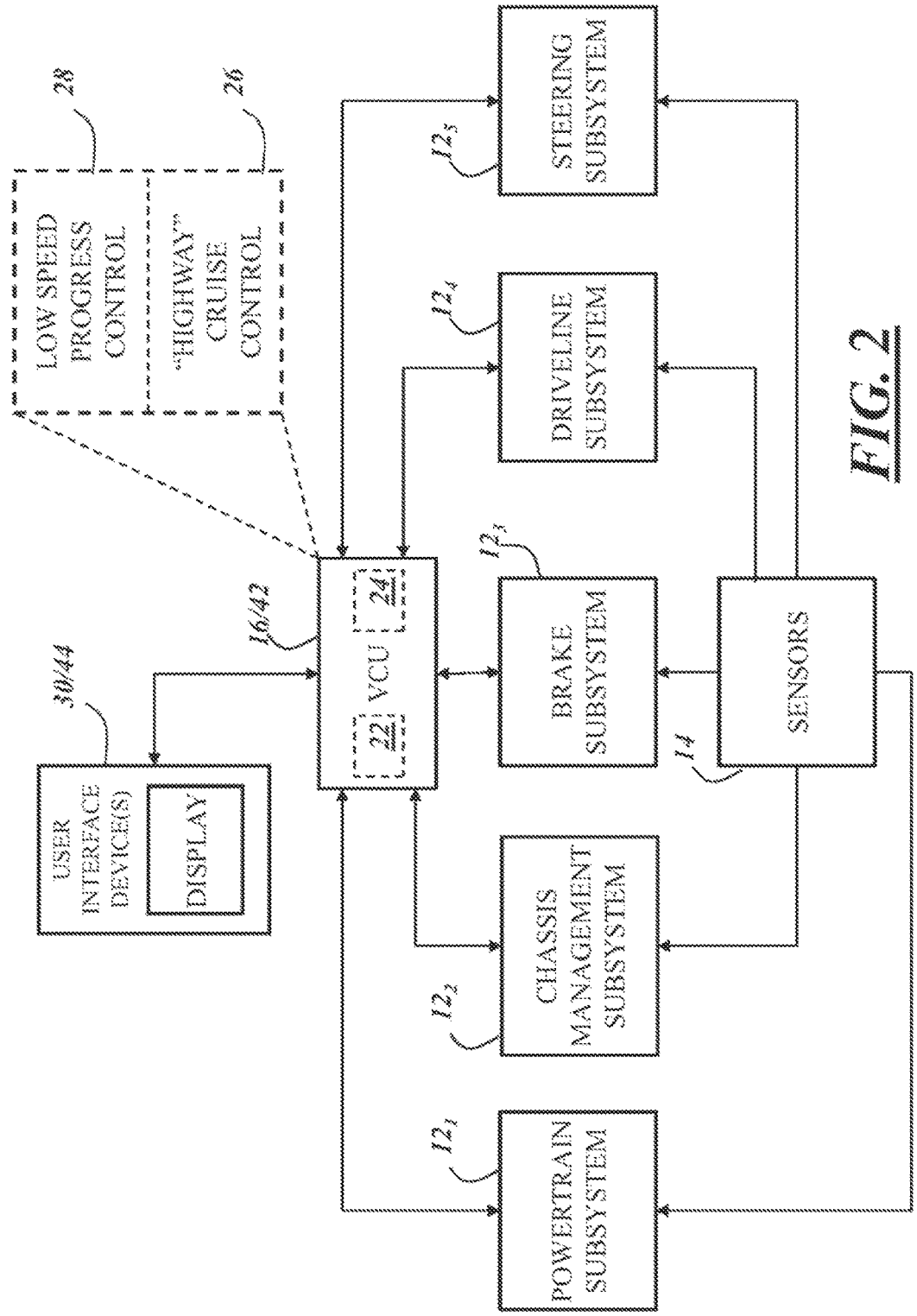
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems. One such subsystem is a powertrain subsystem $12_1$. As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor or a driveline torque sensor) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. Accordingly, the present disclosure is not limited to any one particular powertrain subsystem.

Vehicle 10 may also include a chassis control or management subsystem $12_2$. Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or ether information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using and air compressor (suspension compressor) onboard the vehicle. Chassis management subsystem $12_2$ may further be configured to monitor the altitude of the vehicle. More particularly, subsystem $12_2$ may receive readings or information from one or more of sensors 14 and/or subsystems 12 described or identified herein to evaluate the pitch, roll, and yaw of the vehicle, and therefore, the overall altitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_3$ may be configured to control and/or monitor any number of other or additional parameters/aspects of vehicle 10 in the same or similar manner as that described above. As such, the present disclosure is not limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present disclosure is not limited to any one particular chassis management subsystem Yet another example of subsystem of vehicle 10 is a driveline subsystem $12_4$. As is known in the art, and as is illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer box 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present disclosure is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this disclosure, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In any event, in one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem 12$_1$ as an example, powertrain subsystem 12$_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem 12$_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem 12$_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present disclosure.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to the operation and configuration of vehicle 10, and may include, for example and without limitation, any one or more of: wheel speed sensors; ambient temperature sensors; atmospheric pressure sensors; tyre pressure sensors; gyro sensors to detect yaw, roll, and pitch of the vehicle; vehicle speed sensors; a longitudinal acceleration sensor; an engine torque sensor; a driveline torque sensor; a throttle valve sensor; a steering angle sensor; a steering wheel speed sensors; a gradient sensor; a lateral acceleration sensor on the stability control system (SCS); a brake pedal position sensor; brake pedal pressure sensor; an accelerator pedal position sensor; air suspension sensors (i.e., ride height sensors); wheel position sensors; water defection sensors (for both proximity and depth of wading events); a transfer case HI-LO ratio sensor; an air intake path sensor; and longitudinal, lateral, and vertical motion sensors, among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s), but rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various sensor readings (e.g., such as those generated by vehicle sensors 14), look-up tables or other data structures, algorithms (e.g., the algorithms embodied in the method described below), etc. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
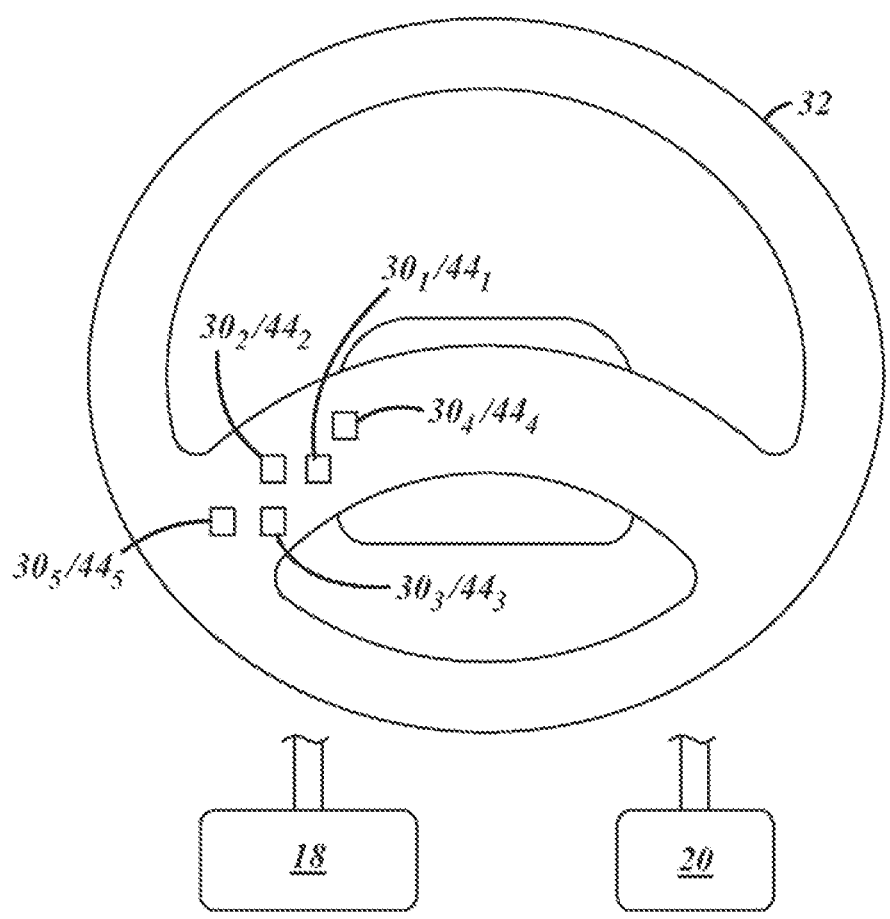
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph, or 1 kph, for example, for vehicles with speed displayed in metric units), and a "−" button $30_3$ to allow the user to decrease the set-speed in the same discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate or suspend the system, as well as a "resume" button $30_5$ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the cruise control function is cancelled and the vehicle reverts to a manual mode of operation requiring user pedal input to maintain vehicle speed. In addition, in at least certain cruise control systems, the detection of a wheel slip event, which may be initiated by a loss of fraction, may also have the effect of cancelling the cruise control function. LSP control system 28 may also differ from such cruise control systems in that, in at least one embodiment, it is configured in such a way that the speed control function provided thereby is not cancelled or deactivated in response to those events described above.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: determining the type and characteristics of the terrain over which vehicle 10 is traveling; monitoring the configuration, state, or status of certain vehicle subsystems 12 and/or vehicle components, parameters, or features; determining whether the vehicle is appropriately configured to traverse the prevailing terrain, and to do so at a particular speed; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
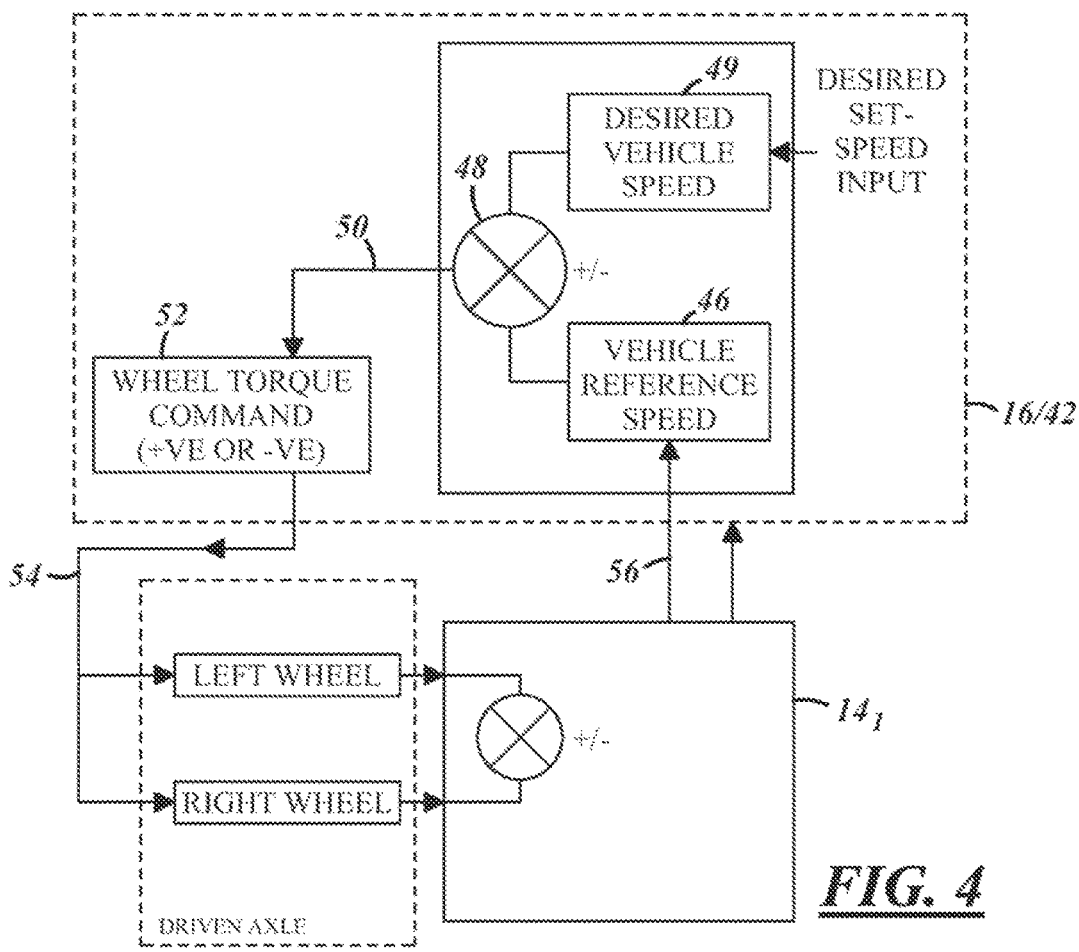
FIG. 4 is a schematic and block diagram illustrating the operation of a speed control system of a vehicle, such as the vehicle illustrated in FIGS. 1 and 2.

More particularly, and with reference to FIG. 4, once the desired set-speed is determined, a vehicle speed sensor (identified as sensor $14_1$ in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 48, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, or otherwise determine information relating to the terrain over which vehicle 10 is traveling (e.g., terrain type, surface classification, terrain roughness, etc.). In accordance with one embodiment, VCU 16, may be configured to perform this function and to do so in a number of ways. One such way is that described in UK Published Application No. GB2492748A published on 16 Jan. 2013, the entire contents of which is incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of the terrain and, in certain instances, one or more characteristics thereof, such as, for example, the roughness of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment and in addition to the estimator module, a road roughness module may also be included for calculating the terrain roughness based on air suspension sensors (the ride height sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/defecting functionality, another component, module, or subsystem of vehicle 10, such as, for example VCU 16 (in the case where it does not perform the functionality of LSP control system 28), chassis management subsystem $12_2$, or another suitable component may be appropriately configured to do so, and such other embodiments remain within the spirit and scope of the present disclosure. Further, it should be appreciated that the foregoing description of the arrangement, functionality, and capability of LSP control system 28 has been provided for purposes of example or illustration only and is not meant to be limiting in nature. Accordingly, LSP control system 28 is not intended to be limited to any one particular embodiment or arrangement.

Once again, the preceding description of vehicle 10 and the illustrations in FIGS. 1 and 2 are only intended to illustrate one potential vehicle arrangement and do so in a general way. Any number of other vehicle arrangements and architectures, including those that differ significantly from the one shown in FIGS. 1 and 2, may be used instead.

Figure 5:
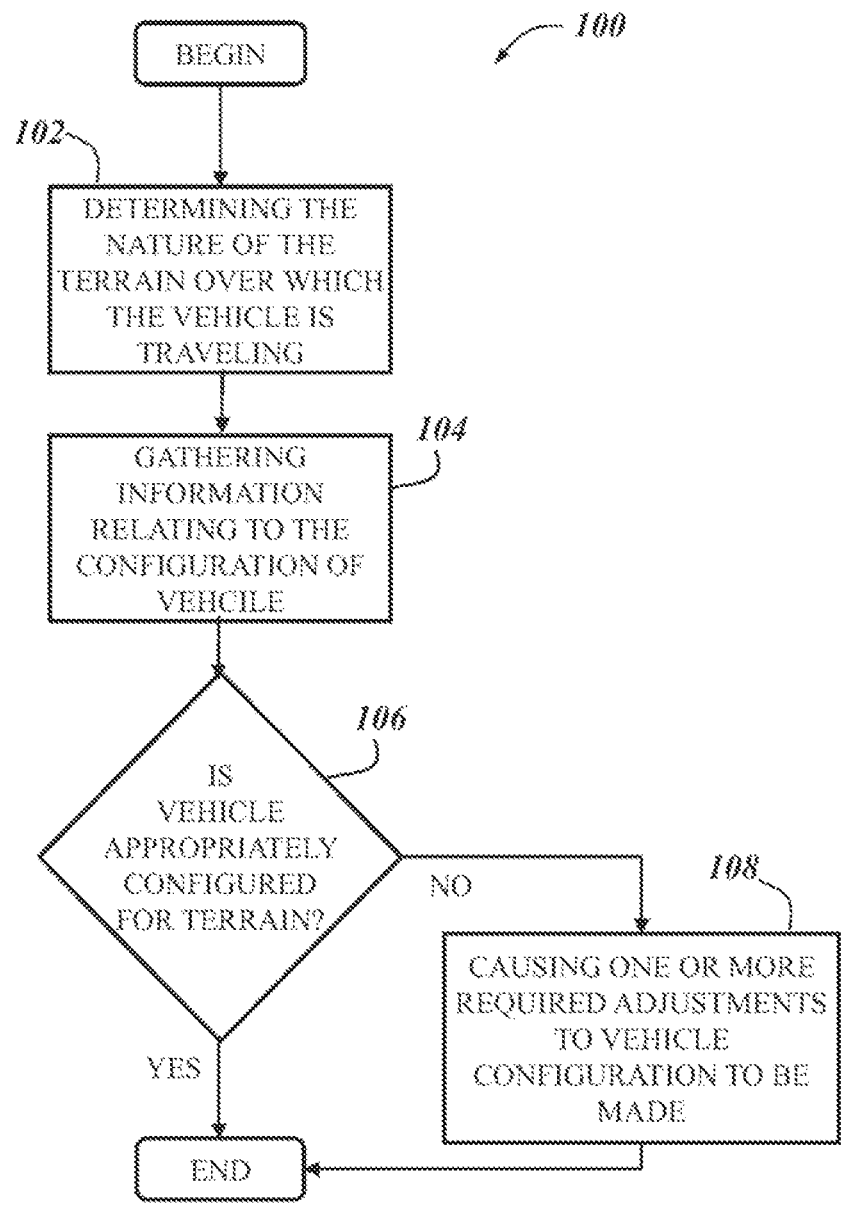

Turning now to FIG. 5, there is shown an example of a method 100 for use with a speed control system of a vehicle. For purposes of illustration and clarity, method 100 will be described in the context of vehicle 10 illustrated in FIGS. 1 and 2 and described above, and more specifically, the low-speed progress (LSP) control system 28 thereof, in particular (which, in an embodiment, is integrated in VCU 16 of vehicle 10 (i.e., VCU 16 comprises ECU 42 of speed control system 28)). It will be appreciated, however, that the application of the present methodology is not meant to be limited solely to such an arrangement, but rather method 100 may find application with any number of other vehicles and/or speed control system arrangements, including, for example, LSP control systems other than that described above (e.g., not integrated within the VCU of a vehicle, and/or the VCU does not comprise the ECU of the LSP control system), as well as, in certain instances, conventional "on-highway" or "on-road" cruise control systems, such as, for example, cruise control system 28 described above. Accordingly, the present disclosure is not meant to be limited to any one particular arrangement or type of vehicle or speed control system. It will also be appreciated that the performance of method 100 is not limited to any one particular order or sequence of steps.

Additionally, the performance or execution of the present method may be precipitated by a number of events or occurrences. One such event is when there has been a change in the requested speed (e.g., set-speed) of the vehicle by either the user or automatically by the speed control system. Another event is when the vehicle transitions from one type of terrain, or from one particular terrain characteristic to another, such as, for example, when the vehicle is attempting to climb boulders or rocks, or transitions from a soft to hard surface, etc. Yet another precipitating event may be a change in another operating parameter of the vehicle, such as, for example, a change in the altitude of the vehicle, the vehicle body acceleration, or another like parameter; or a change in the operating mode of the vehicle (e.g. a change in the terrain mode). Accordingly, any number of events or occurrences may trigger the performance of the present method including events or occurrences other than those described above. Additionally or alternatively, the method may be continuously performed as the vehicle progresses so as to constantly evaluate the vehicle configuration to ensure the vehicle is always appropriately or optimally configured when the speed control system is operating.

To that end, and with reference to FIG. 5, in one embodiment, method 100 comprises a step 102 of determining the nature of the terrain over which the vehicle is traveling. This step may be performed in any number of ways. In one embodiment, readings or information may be received from one or more vehicle sensors or subsystems that allow for the type or classification of the terrain, and in certain instances, various terrain-related characteristics (e.g., roughness), to be determined. One particular way this may be done is that described above with respect to LSP control system 28, the description of which will not be repeated but rather is incorporated here by reference. It will be appreciated, however, that the present disclosure is not limited to this or any other particular way or technique of determining terrain-related information, and therefore, any number of suitable ways or techniques may be used. In certain embodiments, step 102 may further comprise acquiring or determining a desired speed (e.g., set-speed) that the user wants the vehicle to travel at or that is identified by the speed control system itself as being an appropriate speed for the vehicle. Alternatively, this information may be acquired or determined in another step of method 100. In some embodiments, step 102 may be performed by VCU 16 in conjunction with information or readings provided by one or more of subsystems 12 and/or one or more of vehicle sensors 14.

Method 100 further comprises a step 104 of gathering information relating to one or more components, parameters, or features (collectively "parameters") that correspond to the configuration of the vehicle, and that may have a bearing on, for example, off-road capability, ride-ability, vehicle composure, and occupant comfort, in particular. These parameters may include, for example, the ride height of the vehicle, the tyre pressure of one or more of the vehicle tyres, the state of the air intake path, and/or the gear ratio of the transfer case, to name only a few possibilities. In any event, this information may be gathered from a number of sources. For instance, one or more vehicle subsystems (e.g., chassis management subsystem, driveline subsystem, etc.) may be configured to receive readings or signals from one or more vehicle sensors and to then derive information relating to the relevant parameter(s) using those readings or signals. The speed control system, in an embodiment, may then obtain or acquire the information relating to the parameters of interest from the corresponding subsystem(s). In another instance, the speed control system may be configured to receive the information directly from one or more vehicle sensors, or to derive it from readings or signals received from that or those sensors.

For example, and in accordance with one embodiment wherein VCU 16 is configured to perform step 104, VCU 16 may gather information relating to the ride height and tyre pressure of the tyres of vehicle 10 from chassis management subsystem 14$_2$, which, as described in more detail above, is configured to acquire or derive the information from one or more vehicle sensors 14 identified above. VCU 16 may also gather information relating to the transfer case ratio from driveline subsystem 14$_3$, which, as also described above, is configured to control and/or manage such a parameter. In another embodiment, however, VCU 16 may gather this information itself directly from one or more vehicle sensors 14, such as, for example, air suspension sensors (in the case of ride height), tyre pressure sensors (in the case of tyre pressure), a HI/LO ratio sensor (in the case of transfer case ratio), and an intake path sensor (in the case of the state of the intake path), that may be electrically coupled (e.g., over wire(s) or wirelessly) to VCU 16. Accordingly, it will be appreciated that information relating to vehicle parameters that correspond to the configuration of the vehicle may be gathered in any number of ways, including, but not limited to those described above, and that the present disclosure is intended to be limited to any particular way. It will be further appreciated that information relating to parameters that correspond to the configuration of the vehicle in addition to or instead of those described above may also be received and used in the manner described below. Accordingly, the present disclosure is not limited to the evaluation or use of any particular parameter(s).

Once the nature of the terrain has been determined in step 102 and information relating to the configuration of the vehicle has been gathered in step 104, method 100 may further comprise a step 106 of determining, based at least in part on the nature of the terrain and the gathered information, whether the vehicle in its current configuration is appropriately or optimally configured to travel over the prevailing terrain, and, in at least certain instances, to do so at a particular speed (e.g., a set-speed selected by the user, or a set-speed dictated by the speed control system itself). This determination may be made in the context of certain standards or targets relating to, for example, off-road capability, ride-ability, and composure of the vehicle; occupant comfort; and/or any other desirable attribute(s), and may be done so in a number of ways.

For instance, in one embodiment, for each parameter being evaluated, predetermined thresholds or benchmarks (which may be single values or ranges of values, or may be operating states in the instances where the parameters are not represented numerically (e.g., transfer case gear ratio and intake path state)) may be defined for different types of terrains the vehicle may encounter, different speeds the vehicle may operate at, or a combination of both. Each of these thresholds or benchmarks represents what is considered to be the appropriate or optimal configuration for that particular parameter for that particular terrain and/or speed to which it corresponds. The thresholds or benchmarks may be derived or determined (e.g., empirically or otherwise) and may be stored in a memory onboard the vehicle that is part of or accessible by, for example, the speed control system during manufacture of the speed control system and/or vehicle. In such an instance, when a particular terrain and/or speed is sensed or detected, the information for each parameter(s) of interest acquired in step 104 is compared with the respective benchmarks or thresholds corresponding to that or those parameters for the relevant terrain and/or speed (e.g., using, for example, a comparator or some other suitable device of the speed control system). Based on that comparison, a determination may be made for each parameter as to whether it is deemed to be appropriately or optimally configured, and therefore, whether the vehicle is appropriately or optimally configured. In view of the prevalent conditions. In an embodiment, this determination may be made utilizing a data structure (e.g., look-up table) in which the benchmarks/thresholds are stored, a predetermined parameter/terrain/speed profile, or other suitable means known in the art.

For example, assume that vehicle ride height and transfer case gear ratio are two parameters of interest, and that in one embodiment, VCU 16 is configured to perform step 106. Assume further that it is determined that the vehicle is attempting to traverse a boulder field such that the vehicle will be climbing over boulders, and is doing so, or would like to do so, at for example, 3 mph (approximately 5 kph). VCU 16 would acquire the respective predetermined benchmarks or criteria that correspond to that particular terrain and that particular speed from memory device 22, for example, which may dictate that the ride height of the vehicle should be "high" and the transfer case gear ratio should be in the "low" range. Using the information relating to these two parameters gathered in step 104, VCU 16 would compare the current state or status of the ride height and transfer case gear ratio with those benchmarks. If based on this comparison, it determines that one or both of the parameters do not meet the established benchmarks, VCU 16 will further determine that the vehicle is not appropriately or optimally configured for the terrain and the given speed, and the method will proceed to the steps described below; otherwise, it will determine that the vehicle is appropriately configured and the method may end.

It will be appreciated that while a particular technique for performing step 106 has been provided, the present disclosure is not meant to be limited to such a technique; rather, any number of other or additional suitable techniques may be used. For example, in an embodiment wherein benchmarks or thresholds are evaluated, rather than being pre-set during the manufacture of the vehicle as described above, in another embodiment, the benchmarks or thresholds may be derived from use of the vehicle. For example, when a particular terrain is traversed at a particular speed, the state or status of the parameters of interest may be associated with the terrain/speed and recorded in, for example, a memory device of the speed control system and may then be used as benchmarks the next time the vehicle encounters the same or similar terrain/speed). Accordingly, it will be appreciated that the present disclosure is not intended to be limited to any particular technique.

As briefly described above and as shown in FIG. 5, if it is determined that the configuration of the vehicle, or at least certain (e.g. all or less than all, depending on the particular implementation) of these parameters of the vehicle that were evaluated, is appropriate or optimal for the prevailing circumstances or conditions, method 100 may end. If, on the other hand, it is determined that the vehicle is not appropriately or optimally configured, method 100 may comprise one or more additional steps.

With reference to FIGS. 5 and 6, in one embodiment, method 100 further comprises a step 108 of causing or effecting the adjustment of one or more of those parameters) deemed not to be optimally or appropriately configured in a sufficient amount or manner to render them appropriately or optimally configured. In one embodiment, this may include a number of substeps, some or all of which may be optional, depending on the particular implementation.

For instance, in one embodiment, step 108 may comprise a substep 110 of reducing the speed of the vehicle to a predetermined speed, which may include, but does not have to, reducing the speed to a standstill (e.g., 0 mph (0 kph)). Vehicle speed reduction may be achieved by cutting positive torque from the powertrain subsystem to the driveline of the vehicle and allowing the vehicle to coast to a halt, or may be achieved by coordinated control of both powertrain torque and brake torque in order to ensure the vehicle deceleration follows a pre-defined deceleration profile. In such an arrangement, the pre-defined acceleration profile would be optimized for safe progress on a given terrain and composure. The purpose of this substep is to allow time for the required adjustments to be identified and/or to be made. Accordingly, in an embodiment the speed control system (e.g., VCU 16) may command a certain amount of brake torque be applied by the brake subsystem (e.g., brake subsystem 12₃), or to otherwise cause the speed of the vehicle to be reduced. Alternatively, the driver may be commanded to reduce the vehicle speed manually by actuating the vehicle brakes or by reducing the set-speed of the speed control system, or a combination of both.

Whether or not step 108 includes substep 110, step 108 may further include a substep 112 of identifying the required adjustments to the relevant vehicle parameters. This may involve identifying the parameters needing adjustment, as well as identifying what particular adjustments are needed (e.g., that the current state of a parameter needs to be adjusted from a first state to a second state (e.g., from "low" range ratio "high" range ratio, from a "wading" mode to a "normal" mode, etc.), or determining that the current value of a parameter (e.g., tyre pressure) needs to be increased or decreased, and in what amount). This information may all be determined using, for example, the benchmarks to which the current state or status of the parameters were compared in step 106. For example, if the actual tyre pressure may be 10 psi (approximately 69 kPa) higher than the tyre pressure determined to be the optimum or benchmark for a given terrain or operating condition, it may be determined that the tyre pressure needs to be reduced by 10 psi (69 kPa). Similarly, if the transfer case is currently in the "high" ratio and the benchmark determined to be optimal for the prevailing conditions is that it be in the "low" ratio, it may be determined that the appropriate change from "high" to "low" ratio needs to be made. In one embodiment, VCU 16 is configured to perform step 112.

Following the identification in step 112 of the required adjustments, step 108 may further comprise a substep 114 of making the identified adjustments to the appropriate vehicle parameters. In one embodiment, step 114 may be performed automatically by the speed control system. More specially, the speed control system may be configured to directly make the necessary adjustments, or alternatively, may be configured to provide commands to the appropriate vehicle subsystem to make the adjustments. For example, in an embodiment wherein VCU 16 is configured to perform substep 114, VCU 16 may directly control the adjustment of one or more of the parameters, or alternatively, may generate commands and send them to appropriate subsystem 12 of vehicle 10. So, in an instance wherein the tyre pressure of one or more of the tyres of vehicle 10 require adjustment, VCU 12 may send a command to chassis management subsystem 12₂ requesting the requisite adjustment. Similarly, if a change in the transfer case gear ratio is required, VCU 12 may send a command to driveline subsystem 12₄ requesting that the gear ratio be changed. Accordingly, the present disclosure is not limited to any one particular way in which the speed control system may automatically make or control the adjustments to the vehicle parameters.

In any event, in certain instances, the method may further comprise a step (not shown) of generating a message for the user of the vehicle advising that adjustments are being made to the configuration of the vehicle. This may further comprise, for example, displaying the message audibly and/or visually on an appropriately configured user interface device in close proximity to the user. In one embodiment, this functionality may be performed by VCU 16 in conjunction with one or more user interface devices 44.

In another embodiment, rather than the speed control system automatically making, or causing to be made, the required adjustments, the method may comprise a step (not shown) of generating an advisory message for the user of the vehicle indicating or recommending that one or more adjustments to one or more vehicle parameters foe made by the user. This may further comprise, for example, displaying the message audibly and/or visually on an appropriately configured user interface device in close proximity to the user. In response, the user may either make, or cause to be made, some or all of the adjustments themselves (using, for example, one or more manual user interface devices in the vehicle cabin), or take other action such as changing their route, adjusting the speed to a more appropriate speed in view of the vehicles configuration, etc. Alternatively, the user may be provided the option to instruct that at least certain of the adjustments be made automatically utilizing the same or a different user interface device (i.e., confirm that the adjustments should be made), or to decline the recommendations, assuming the responsibility and attendant risk that may be associated with ignoring the advice, and instructing the vehicle to proceed without making some or all of the recommended adjustments. In an embodiment, this step may be performed by VCU 16 in conjunction with one or more user interface devices 44.

Accordingly, it will be appreciated, in view of the above, that any number of techniques may be used to make the adjustments necessary for the vehicle to be appropriately configured for the prevailing terrain, desired speed, or both, and that the present disclosure is not limited to any particular technique.

Regardless of the manner in which the adjustments may be made, in an embodiment, method 100 may further comprise the steps (not shown) of verifying that some or all of the adjustments have been made, and then increasing the speed of the vehicle to either the desired set-speed, or another more appropriate speed, such verification has been made. The verifying step may be performed automatically by the speed control system by checking to see if the state or status of the relevant parameters has been updated accordingly (e.g., through readings or signals received directly from one or more vehicle sensors, or information received from the corresponding subsystems), or alternatively, may require that the user provide confirmation that they made the necessary adjustments themselves. The step of increasing the speed may be performed by commanding the powertrain subsystem to output the required torque to meet the appropriate speed, and/or commanding the brake subsystem to reduce the amount of braking torque being applied. In one embodiment, VCU 16 may be configured to perform these steps alone or, if appropriate, in conjunction with one or more user interface devices 44.

In addition to the description above, in certain embodiments, and depending on the prevailing conditions, it may be appropriate to prioritize the required adjustments, or at least the order in which they are made. In such an embodiment, the speed control system may allow the vehicle to resume normal operation without each required adjustment being made, so long as at least certain of the adjustments have been confirmed as being made; however, it may do so with acceleration at a reduced/managed rate. Accordingly, in certain instances, not all identified, recommended, or required adjustments have to be made for a vehicle to continue on its journey.

It will be appreciated in view of the above that a benefit of the present system and method is that by monitoring the configuration of the vehicle and making selective adjustments thereto based on the prevailing terrain and vehicle speed, the speed control system may be able enhance vehicle composure and/or occupant comfort, as well as reduce wear and tear on the vehicle and ensure the maintenance of suitable progress of the vehicle.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with, a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method for use with a speed control system of a vehicle, comprising:
   receiving readings from one or more vehicle sensors to determine the nature of the terrain over which the vehicle is traveling at an initial vehicle speed;
   gathering information relating to one or more parameters of the vehicle that correspond to the subsystem configuration of the vehicle;
   identifying, based on the nature of the terrain and the gathered information, one or more adjustments to one or more of the parameters;
   identifying, based upon the adjustments, a reduction in vehicle speed to a first predetermined speed for making the adjustments;
   in response to the identification of said one or more adjustments to one or more of the parameters, automatically reducing the speed of the vehicle to the first predetermined speed to make the adjustments, and causing at least one of the one or more of the identified adjustments to be made after the speed of the vehicle is reduced;
   verifying that the at least one of the one or more identified adjustments have been made after the speed of the vehicle is reduced; and
   in response to the verification that the at least one of the one or more identified adjustments have been made, increasing the speed of the vehicle to a second predetermined speed.

2. The method of claim 1, further comprising automatically causing the one or more adjustments to be made to the one or more of the parameters.

3. The method of claim 1, further comprising generating a message for a user of the vehicle recommending that the one or more identified adjustments be made.

4. The method of claim 3, further comprising receiving a user input representative of instructions to make at least one of the one or more identified adjustments.

5. The method of claim 1, further comprising:
   determining a desired speed for the vehicle;
   wherein the one or more adjustments to the one or more of the parameters are identified based on at least the desired speed, the nature of the terrain, and the gathered information.

6. The method of claim 1, further comprising generating a message for a user of the vehicle recommending that the one or more identified adjustments be made.

7. The method of claim 1, further comprising making at least one of the one or more identified adjustments to at least one of the one or more parameters.

8. The method of claim 7, further comprising:
verifying that the at least one of the one or more identified adjustments have been made; and
in response, increasing the speed of the vehicle to the desired speed.

9. The method of claim 1, wherein the one or more parameters include at least a vehicle ride height.

10. The method of claim 1, wherein the one or more parameters include at least a transfer case ratio.

11. The method of claim 1, wherein the one or more parameters include at least a tire pressure.

12. An automatic speed control system for a vehicle, comprising:
an electronic control unit configured to:
determine the nature of the terrain over which the vehicle is traveling at an initial vehicle speed;
obtain information relating to one or more parameters that correspond to the subsystem configuration of the vehicle; and
identify, based on the nature of the terrain and the obtained information, one or more adjustments to one or more of the parameters;
identify, based upon the adjustments, a reduction in vehicle speed to a first predetermined speed for making the adjustments;
in response to the identification of said one or more adjustments to one or more of the parameters, cause the speed of the vehicle to be reduced to the first predetermined speed to make the adjustments, and cause at least one of the one or more identified adjustments to be made after the speed of the vehicle is reduced;
verify that the at least one of the one or more identified adjustments have been made after the speed of the vehicle is reduced; and
in response to the verification that the at least one of the one or more identified adjustments have been made, cause the speed of the vehicle to increase to a second predetermined speed.

13. The system of claim 12, wherein the system further comprises a display device, and further wherein the electronic control unit is operable to:
generate a message to a user recommending that the one or more identified adjustments be made; and
control the display device to cause the message to be displayed thereon.

14. The system of claim 12, wherein the electronic control unit is further configured to:
determine a desired speed for the vehicle;
wherein the one or more adjustments to the one or more of the parameters are identified based on the nature of the terrain, the obtained information, and the desired speed.

15. A vehicle comprising an automatic speed control system for a vehicle, comprising:
an electronic control unit configured to:
determine the nature of the terrain over which the vehicle is traveling at an initial vehicle speed;
obtain information relating to one or more parameters that correspond to the subsystem configuration of the vehicle; and
identify, based on the nature of the terrain and the obtained information, one or more adjustments to one or more of the parameters;
identify, based upon the adjustments, a reduction in vehicle speed to a first predetermined speed for making the adjustments:
in response to the identification of said one or more adjustments to one or more of the parameters, cause the speed of the vehicle to be reduced to the first predetermined speed to make the adjustments, and cause at least one of the one or more identified adjustments to be made after the speed of the vehicle is reduced;
verify that the at least one of the one or more identified adjustments have been made after the speed of the vehicle is reduced; and
in response to the verification that the at least one of the one or more identified adjustments have been made, cause the speed of the vehicle to increase to a second predetermined speed.

* * * * *